Sept. 6, 1955      F. T. WIMBERLY      2,717,378
DISTANCE MEASURING DEVICES

Filed Aug. 2, 1952      2 Sheets-Sheet 1

INVENTOR
FLOYD T. WIMBERLY

BY *Elmer J. Gorn*
ATTORNEY

Sept. 6, 1955  F. T. WIMBERLY  2,717,378
DISTANCE MEASURING DEVICES
Filed Aug. 2, 1952  2 Sheets-Sheet 2

INVENTOR
FLOYD T. WIMBERLY
BY Elmer J. Gorn
ATTORNEY

United States Patent Office 2,717,378
Patented Sept. 6, 1955

2,717,378

DISTANCE MEASURING DEVICES

Floyd T. Wimberly, Watertown, Mass., assignor to Raytheon Manufacturing Company, Newton, Mass., a corporation of Delaware Application August 2, 1952, Serial No. 302,300

14 Claims. (Cl. 343—14)

This invention relates to distance measuring devices, and more particularly to frequency modulated altimeters whose percentage accuracy is substantially independent of altitude.

An object of this invention is to provide a distance measuring device capable of providing an accurate and easily interpreted indication of altitude over a wide altitude range using a single-scale indicator.

An additional object of this invention is to provide a distance measuring device of the frequency modulated type wherein the percentage reading accuracy of the indicator scale is substantially independent of altitude.

Another object of this invention is to provide a frequency modulated altimeter wherein the frequency sweep width is varied with altitude over a portion of the altitude range while the beat frequency is held constant.

Still another object of this invention is to provide an altimeter having a linear scale at low altitudes and a compressed or non-linear scale at higher altitudes.

A further object of this invention is to provide a distance measuring device having a substantially logarithmic indicator scale with the use of linear potentiometers.

The ideal type of indicator scale for distance measuring devices such as absolute altimeters is one whose percentage reading accuracy is independent of altitude. Although a logarithmic scale would fulfill this requirement, it is difficult, because of fundamental design features which will be pointed out subsequently, to obtain a purely logarithmic scale. Moreover, at low altitudes, where accuracy of meter interpretations is vital, a linear scale allows for greater ease and accuracy in reading.

An excellent compromise is obtained by making the scale linear from zero to 200 feet and approximately logarithmic from 200 to 20,000 feet.

A frequency modulated radio altimeter measures the altitude of an aircraft by determining the time required for a signal to travel from aircraft to earth and return. A frequency modulated signal is radiated to the ground and a portion thereof is reflected back to the aircraft and compared at the receiver with the instantaneous transmitter output frequency. A period of time elapses between the transmission of the signal and its arrival back at the receiver during which the transmitter frequency has changed, causing a frequency difference to exist between the two signals at the receiver.

The basic equation for the operation of any frequency modulated altimeter is $$f_d = \frac{f_m B h}{246} \quad (1)$$

where $h$ is the altitude in feet, $f_m$ is the modulator sweep frequency in cycles per second, $f_d$ is the audio beat frequency between the instantaneous transmitted and received signals in cycles per second and $B$ is the peak-to-peak FM band width or deviation of the transmitter frequency in megacycles.

If $f_m$ is held constant, then $$f_d = kBh \quad (2)$$

By maintaining B constant over the range of zero to 200 feet, it is evident from Equation 2 that $f_d$ increases linearly with increasing altitude. In other words, since the elapsed time between the transmitted and reflected signal is proportional to altitude and the difference frequency $f_d$ is proportional to the elapsed time, the difference frequency is proportional to altitude.

A frequency counter converts $f_d$ into a negative direct current voltage to operate a servo indicator positioning mechanism. The negative output of the counter is balanced to a null by a positive bias voltage derived from a low altitude follow-up potentiometer mechanically coupled to a servomotor. This positive balancing voltage is varied by said potentiometer linearly from a minimum value at zero altitude to a maximum at 200 feet. Since the transmitter sweep width B is held constant over this range, the output voltage of the counter will rise from a minimum at zero feet to a maximum at 200 feet. In this way, the servo system automatically positions the indicator pointer by adjusting the positive bias voltage to just cancel the output voltage of the counter.

In prior FM altimeters, the FM band width B is constant throughout the entire range of the equipment and the change in $f_d$ is used as a measure of altitude. With this system, $f_d$ becomes quite large as high altitudes are reached.

Certain advantages arise from keeping the difference frequency $f_d$ constant and varying B at the higher altitudes. Firstly, by maintaining $f_d$ constant at a relatively low value and varying B, a relatively narrow band audio amplifier system suffices so that the system noise is decreased and the system sensitivity increased.

Secondly, any type of indicator scale may be obtained depending upon the manner in which B is varied with altitude. For example, if B were varied directly as the reciprocal of the altitude, a linear scale would result, whereas, if B were varied in proportion to the reciprocal of the logarithm of the altitude, a logarithmic scale would result.

Above 200 feet indicated altitude the transmitter sweep width B is reduced as the altitude increases. This is accomplished by means of a voltage divider circuit comprising a pair of high altitude potentiometers mechanically coupled to the servomotor. This voltage divider circuit is connected between the output of the modulator sweep generator and the transmitter. The position of the two high altitude potentiometers is dependent upon the position of the servomotor, which, as already stated, is a function of altitude. As the altitude changes, the voltage divider ratio of the high altitude potentiometer changes in such a manner that the output of said divider varies nearly as the reciprocal of the logarithm of the input voltage to the divider for altitudes above 200 feet. A portion of the sweep generator voltage developed across the aforesaid voltage divider varies in amplitude over a 100-to-1 range over an altitude range of 200 feet to 20,000 feet and is applied to the transmitter to vary its frequency deviation B. In this way, as altitude increases above 200 feet, the transmitter sweep width B, which varies substantially inversely as the logarithm of the input voltage to the potentiometer divider, alters the audio difference frequency $f_d$ until the servo is returned to rest. The position of the indicator dial pointer attached to the servomotor shaft is thus an indication of the correct altitude.

Referring to Equation 2, it is evident that it is not feasible to vary B through the entire altitude range of the equipment since this would require that B be infinite at zero altitude and impracticably large at altitudes near zero feet. Furthermore, as previously stated, greater ease and accuracy in reading—which is extremely important at lower altitudes—is obtainable with a linear, rather than a logarithmic scale. For this reason the sweep width B is held constant at altitudes below 200 feet, as in the systems of the prior art, and the bias voltage applied to the frequency counter is varied by the low altitude potentiometer so that it just cancels the voltage supplied by the counter and the servomotor once more returns to rest.

Transition at 200 feet from the range of operation of the low altitude potentiometer to that of the high altitude potentiometers is automatic and the indication throughout the entire range of operation is continuous.

As previously stated, if B were varied in proportion to the reciprocal of the logarithm of the altitude, an ideal logarithmic scale would result. However, since servo follow-up potentiometers are used to vary B and since high accuracies are required, it is not possible to use logarithmic potentiometers due to the fact that it is extremely difficult, if not impossible, to wind logarithmic potentiometers accurately. In addition, because of the 100-to-1 band width compression a two-cycle log potentiometer would be required. The repeatability of present logarithmic potentiometers, however, is insufficient for use in the altimeter of the subject invention. In accordance with this invention, a close approximation of the desired logarithmic variation may be readily obtained by means of linear potentiometers which are quite accurate and easily constructed.

Figure 1:
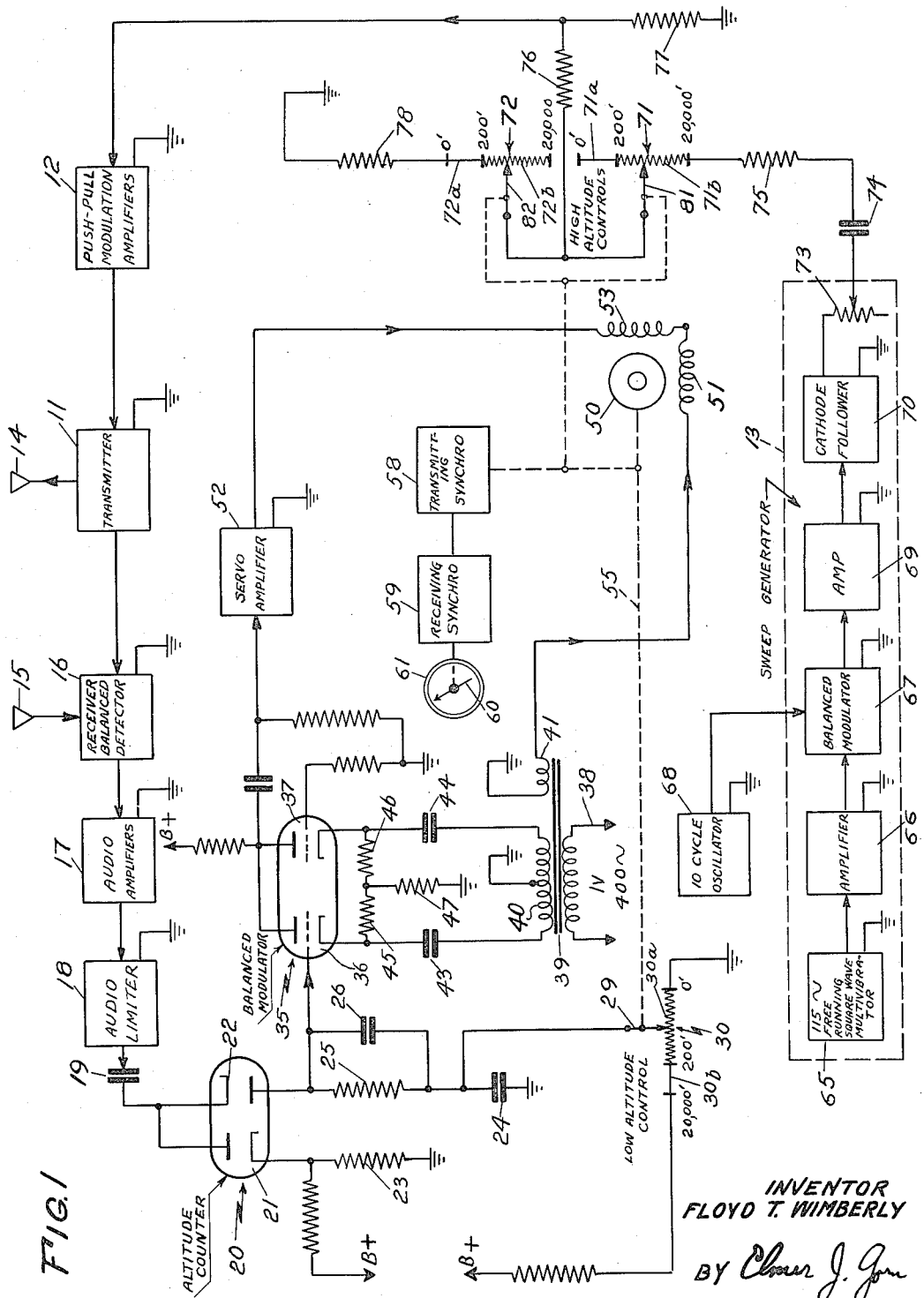
Fig. 1 is a diagram, partly schematic, illustrating an embodiment of the subject invention.

Referring to Fig. 1, a frequency modulated altimeter is shown comprising ultra high frequency transmitter 11 periodically modulated by a frequency modulator 12 energized by sweep generator unit 13. Transmitter 11 may be any type of frequency modulated magnetron or may be a frequency modulated klystron or ultra high frequency vacuum tube oscillator. The frequency modulated signal generated by transmitter 11 is applied to an antenna 14 associated with the transmitter and mounted on the underside of the aircraft wing or fuselage. The transmitted signal is radiated downward toward the terrain over which the aircraft is flying and is reflected back from said terrain to be received by receiving antenna 15 mounted adjacent transmitting antenna 14. The signal received by antenna 15 is fed into a balanced detector 16; a small portion of the output of transmitter 11 is also coupled directly to the input of said balanced detector, which may be of the type shown in application for U. S. Letters Patent, Ser. No. 212,932, of Jenks et al., filed February 27, 1951.

The heterodyne beat frequency output resulting from the mixing of the direct and reflected signals in detector 16 is fed into the input circuit of a multi-stage audio amplifier 17 which amplifies the audio beat signal to a level suitable for operation of amplitude limiter 18. The amplitude-limited output of limiter 18 is coupled through counter capacitor 19 to altitude counter 20, which is a frequency counter which develops a negative direct current voltage proportional to the frequency of the square wave limited signal. Since the output of a counter is also dependent upon the amplitude of the input signal, counter 20 must be preceded by limiter 18 so that the direct current output of counter 20 varies only with frequency.

Altitude counter stage 20 comprises diode sections 21 and 22 connected back to back as shown in Fig. 1. During each cycle of the applied square wave voltage from limiter 18, counter capacitor 19 is charged through diode section 21 to a positive voltage point through resistor 23, while capacitor 19 is discharged through diode section 22 into capacitor 24 to load resistor 25. A capacitor 26 serves to filter the charging capacitor current. Since the number of discharges per second is equal to the applied frequency, the total current will be proportional to frequency. Hence, a negative direct current voltage proportional to frequency will be developed across load resistor 25.

A positive counter bias voltage or bucking voltage is applied to the junction point of capacitor 24 and resistor 25 and is varied from approximately zero at zero altitude to a maximum positive value at 200 feet and held constant at this maximum value at altitudes above 200 feet by means of low altitude control potentiometer 30 which will be more fully described subsequently.

The output voltage from the plate of diode section 22 is applied to a balanced modulator stage 35 whose function is to convert the direct current output of counter 20 to a 400-cycle alternating current signal that is proportional in amplitude and phase to the amplitude and polarity of the counter output to provide a means for operating an alternating current servo system (to be described later) for controlling the position of the indicator dial pointer. Triode sections 36 and 37 of modulator 35 are arranged with their grid and cathode circuits connected in push-pull and with their plates connected in parallel. A 400-cycle alternating current voltage whose magnitude is approximately one volt is derived across secondary winding 40 of transformer 39 having a primary winding 38. Secondary winding 40, whose midpoint is grounded, is connected to the cathodes of modulator 35 through capacitors 43 and 44 which are of equal size.

When modulator 35 is balanced, that is, when both triodes 36 and 37 are biased so that they conduct equally, the 400-cycle voltage developed in the plate circuit owing to the alternating current input applied to the cathode of triode section 36 will be cancelled by the alternating current voltage developed in the plate circuit owing to the alternating current input voltage applied to the cathode of triode section 37, and there will be no modulator output. Equal amounts of cathode bias are applied to triode sections 36 and 37 through resistors 45 and 46 and common cathode resistor 47 so that the circuit will be in its balanced condition with zero input.

When a direct current error signal is applied to the grid of modulator tube 36, it unbalances the modulator, causing it to produce an alternating current output voltage because of the error voltage biasing the two tube sections so that they conduct unequally in response to the alternating current excitation applied to the cathodes.

When the counter error voltage is positive (the indicated altitude is higher than the actual altitude), it decreases the bias on tube 36 causing it to conduct more than tube 37. This unbalances modulator 35 and causes an alternating current ripple voltage to be developed in the plate circuit of modulator 35, the predominating phase of which is descriptive of the alternating current voltage applied to one of the modulator cathodes.

When the counter error voltage is negative (indicated altitude is less than actual altitude) it increases the bias on tube 36 causing it to conduct less than tube 37. This unbalances modulator 35 in the other direction and causes an alternating current ripple voltage to be developed in the plate circuit, whose predominating phase is indicative of the alternating current voltage applied to the other modulator cathode and which, therefore, is 180 degrees out of phase with that developed by a positive error signal.

The amplitude of the alternating current voltage developed in the modulator plate circuit is proportional to the amplitude of the applied signal up to the point at which limiting occurs. Limiting occurs for a positive error signal when the error voltage is high enough to drive triode 36 into grid current and for a negative error signal when the error is large enough to drive triode 36 to cutoff.

One winding 51 of a two-phase servomotor 50 is continuously excited from a secondary winding 41 on transformer 39 and the phase of the alternating current voltages applied to the modulator cathodes is shifted 90 degrees by a network consisting of capacitors 43 and 44 and resistors 45 and 46. Therefore, the alternating current voltage developed in the plate circuit of modulator 35 will be either ninety degrees or 270 degrees out of phase with respect to the motor excitation, depending on the polarity of the error signal.

The alternating current voltage developed in the modulator plate circuit is amplified by servo amplifier 52, whose output voltage is applied to the control winding 53 of servomotor 50. The output voltage applied to control winding 53 of motor 50 will be either 90 degrees or 270 degrees out of phase with respect to the voltage applied to excitation winding 51 of motor 50, depending upon the polarity of the error signal from amplitude counter 20, causing motor 50 to rotate in either one direction or the other.

The servo system is set up so that the alternating current voltage produced by a positive error signal at altitude counter 20 will cause motor 50 to run in a direction that decreases the indicated altitude and a negative error signal at the counter will cause motor 50 to run in the direction productive of an increase in indicated altitude.

The shaft 55 of servomotor drives a transmitting synchro 58 which is electrically connected to receiving synchro 59 in the usual manner. A pointer 60 on altitude indicator 61 is mechanically connected to the output shaft of receiving synchro 59.

The sweep generator unit 13 previously referred to functions to produce a 115-cycle square wave which is applied to the input of modulator 12. The frequency of the square wave given is merely illustrative; a departure from 115 cycles per second may be made, depending on the equipment constants desired. The sweep generator includes a free-running multivibrator 65 which produces a square wave output whose frequency is approximately 115 cycles per second. A regulated source of plate power (not shown) maintains the multivibrator frequency constant in spite of line voltage fluctuations. The output of multivibrator 65 is amplified by amplifier 66 and applied to one input circuit of a balanced modulator 67. A second input to the balanced modulator is derived from a ten-cycle sinusoidal oscillator 68, whose sinusoidal output voltage amplitude modulates the 115-cycle square wave from multivibrator 65 at a ten-cycle rate. The modulated square wave output is amplified by amplifier 69 and fed to a cathode follower 70.

As previously stated it is desirable that the altitude indicator scale be linear over the range from zero to 200 feet and, therefore, that the difference frequency $f_d$ increase linearly with altitude. The Low Altitude Control potentiometer 30 has an active resistance winding 30a occupying the first 120 degrees of the potentiometer and a shorted portion 30b occupying the remaining 200 degrees of the potentiometer. Potentiometer 30 is wound so that the resistance of portion 30a, corresponding to an altitude range from zero to 200 feet, increases linearly from zero to 120 degrees of rotation. The 320 degrees point of potentiometer 30 is equivalent to 20,000 feet. The resistance of potentiometer 30, therefore, rises linearly from zero at zero feet to a maximum value at 200 feet and then remains constant at this maximum value for increased rotation over the shorted portion 30b, corresponding to altitudes from 200 feet to 20,000 feet. Below 200 feet potentiometer 30 driven by servomotor 50 feeds back a variable positive bucking voltage to altitude counter 20 to cancel the negative counter voltage. Whenever the bucking bias voltage is equal to the altitude counter bias voltage, there is no input applied to servo amplifier 52 and servomotor 50 remains stationary. However, when the altitude counter voltage and bias voltage are not equal, an input signal proportional in amplitude and polarity to the amount and direction of the difference between the two voltages is applied to servo amplifier 52, therefore causing servomotor 50 to run until it has reduced the error to zero. The position of the arm 29 of potentiometer 30, therefore, is an indication of the altitude, and since potentiometer 30 is linear over the portion 30a, the position of arm 29 will change linearly with altitude over the range of zero to 200 feet.

Above 200 feet, the counter bucking voltage is held constant since the arm 29 of potentiometer 30 is in contact with the shorted portion 30b. In order to hold the received heterodyne beat frequency constant over the altitude range of 200 to 20,000 feet, the magnetron FM band width B, and hence the amplitude of the square wave developed in sweep generator unit 13, must be compressed by a factor of 100-to-1 as the altitude indicator reading increases from 200 to 20,000 feet. This is accomplished by a pair of High Altitude Control potentiometers 71 and 72, each of which has a shorted section 71a and 72a, respectively, and a linear active resistance winding 71b and 72b, respectively. The total shaft rotation of 320 degrees is used to cover the range of zero to 20,000 feet, just as in the case of Low Altitude Control potentiometer 30. The shorted section of potentiometers 71 and 72, corresponding to altitudes of zero to 200 feet, occupies the first 120 degrees of potentiometers 71 and 72 while the active resistance portions of said potentiometer occupy the portion from 120 degrees to 320 degrees. The potentiometers 71 and 72 are used to vary the FM sweep width to hold the counter voltage equal to the bucking voltage applied to the counter. Since the transmitter FM sweep width B can, under these conditions, be used as an indication of altitude, the position of motor shaft 55 is still indicative of altitude.

The square wave output from the cathode of cathode follower 70 is applied to one end of potentiometer 71 through variable resistor 73, direct current isolating capacitor 74 and series resistor 75. Resistor 73 is a calibration resistor which varies the slope of the curve shown in Fig. 5 at higher sweep widths; this control enables the operator to compensate for residual altitude or the antenna height above ground when the aircraft wheels are in contact with the ground. The arm of potentiometer 72 is returned to ground through two paths, one of which consists of voltage divider made up of resistors 76 and 77 and the input to the modulator 12, and the other of which consists of High Altitude Control potentiometer 72 and series resistor 78. By varying potentiometers 71 and 72, the voltage divider ratio of 71 and 72 and the path from their arms 81 and 82 to ground change in a substantially logarithmic manner over a range of 100 to 1 as the indicator reading changes from 200 feet to 20,000 feet. The potentiometers 71 and 72, in other words, are arranged in a circuit so that decreasing amounts of arm rotation are required to produce a given amount of FM sweep width reduction as altitude increases. Therefore, by using the shaft position of potentiometer 30 as an indication of altitude, the altitude indicator scale will be linear over the range from zero to 200 feet and compressed above 200 feet. A voltage will be developed between the arms 81 and 82 of potentiometers 71 and 72 and ground which varies over 100 to 1 range. This voltage is applied to the input of modulator 12 to frequency modulate the transmitter 11.

Since the resistance of 71 and 72 does not change over the first 120 degrees or rotation, the amplitude of the square wave output does not change and the transmitter sweep width B is held constant from zero to 200 feet. Beyond the 120 degrees point on the High Altitude Control potentiometers, the net resistance of 71 and 72 changes and is in the direction that causes the amplitude of the square wave output to decrease with increasing rotation. If only a single linear potentiometer is used, the amplitude of the output square wave would change as $$\frac{1}{R}$$

where R is the resistance of the potentiometer and the arm of the potentiometer would advance linearly with increasing altitude. However, by using two linear potentiometers connected in series, another $$\frac{1}{R}$$

factor is added and causes the potentiometer arms to advance approximately as the logarithm of the altitude. The amount of potentiometer arm rotation is therefore compressed as altitude increases and, by using the position of the potentiometer arms as an indication of the altitude, the desired non-linear altitude indication above 200 feet is produced.

Figure 2:
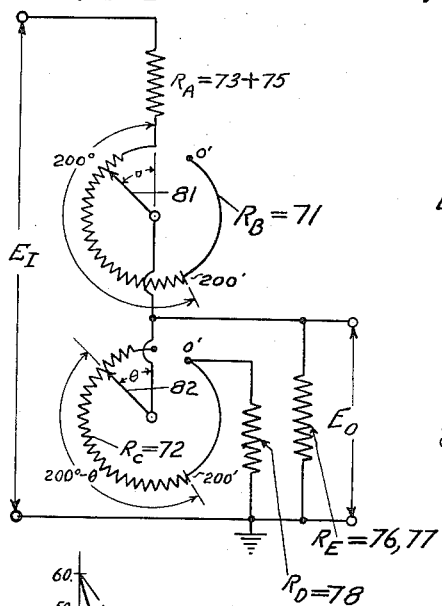
Figs. 2 to 4 illustrate equivalent circuits of the sweep generator voltage divider output circuit of Fig. 1.

The equivalent High Altitude Control potentiometer circuit is shown in Fig. 2 in which the equivalent resistance elements are indicated by appropriately lettered subscripts and the circuit element of Fig. 1 corresponding to each equivalent element is indicated by the same reference numerals as in Fig. 1. For example, resistor $R_A$ is equivalent to resistors 73 and 75 in series, $R_E$ is the equivalent resistance of resistors 76 and 77 in parallel, and so forth. Both potentiometers $R_B$ and $R_C$ are assumed to have 200 degrees of active resistance winding.

The proportion of the total active resistance of potentiometer 71 in the voltage divider circuit when the arm 81 of potentiometer 71 is in the position $\theta$ degrees removed from one end portion 71a is $$\frac{\theta}{200}$$

In other words, the effective value of potentiometer 71 is $$R_B\left(\frac{\theta}{200}\right)$$

Likewise the ratio of the effective resistance of potentiometer 72 when arm 82 is removed from one end of the portion 72a to the total active resistance of potentiometer 72 is $$\frac{200-\theta}{200}$$

Figure 3:
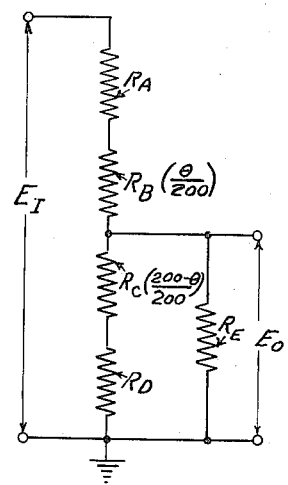

The equivalent circuit of Fig. 2 is shown in Fig. 3.

Figure 4:
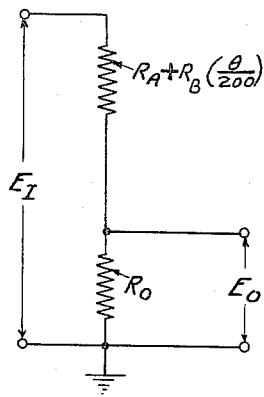

The circuit of Fig. 3 can be further simplified, as shown in Fig. 4, where the equivalent resistance $R_0$ of the circuit comprising resistor $R_E$ in parallel with serially-connected resistors $$R_C\left(\frac{200-\theta}{200}\right)$$

and $R_D$ is given by $$R_0 = \frac{R_E\left[R_C\left(\frac{200-\theta}{200}\right)+R_D\right]}{R_E+\left[R_C\left(\frac{200-\theta}{200}\right)+R_D\right]} \quad (3)$$

The output voltage $E_0$ across $R_0$ at any angle $\theta$ in terms of a given input voltage $E_I$, $R_A$, $R_B$, $R_C$, $R_D$, $R_E$ and $\theta$ is $$E_0 = E_I \frac{R_0}{R_0+R_A+R_B\left(\frac{\theta}{200}\right)} \quad (4)$$

Substitute the value of $R_0$ of Equation 3 in Equation 4, $E_0$ is given by $$E_0 = E_I \frac{R_E\left[R_C\left(\frac{200-\theta}{200}\right)+R_D\right]}{\left\{R_C\left(\frac{200-\theta}{200}\right)+R_D+R_E\right\}\left\{R_A+R_B\frac{\theta}{200}+\left[\frac{R_E\left[R_C\left(\frac{200-\theta}{200}\right)+R_D\right]}{R_C\left(\frac{200-\theta}{200}\right)+R_D+R_E}\right]\right\}} \quad (5)$$

Figure 5:
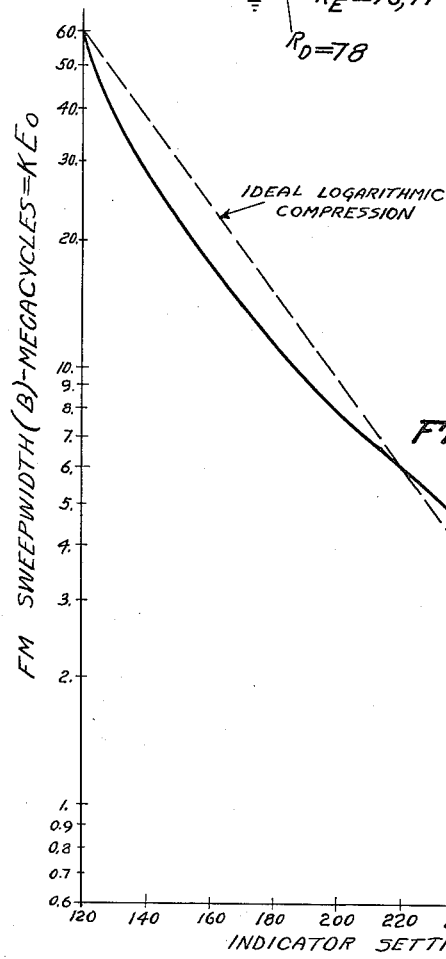
Fig. 5 is a curve illustrating the manner of variation of the sweep generator output voltage with portions of the high altitude control potentiometers shown in Fig. 1.

A solid line graph in Fig. 5 depicts the variation of the FM sweep width B (which is directly proportional to the output voltage $E_0$ derived from the circuit of Fig. 2 and applied to modulator 12) with angular rotation of servomotor shaft 55 to which control potentiometers 30, 71 and 72 and altitude indicator pointer 60 are attached. The FM sweep width B is reduced from approximately 60 mc. at 200 ft. to approximately 0.6 mc. at 20,000 ft. The voltage $E_0$ and therefore B will vary approximately in proportion to the reciprocal of the square of the altitude. The ideal logarithmic compression is shown by a dotted line in Fig. 5. It will be noted that the actual compression obtained by the use of the circuit of Fig. 2 closely approximates the ideal compression.

Figure 6:
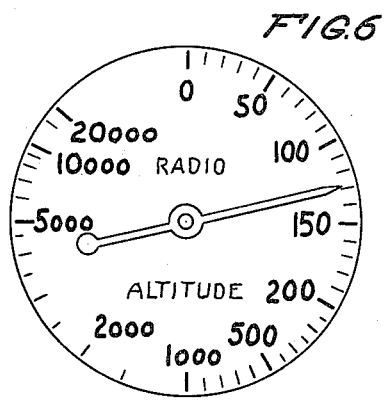
Fig. 6 is a plan view of the indicator dial of the altimeter shown in Fig. 1.

The indicator scale derived by means of the system of the subject invention is shown in Fig. 6. The scale will be seen to be linear from zero to 200 feet and approximately logarithmic from 200 to 20,000 feet.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A frequency modulated distance measuring device for measuring the distance between a body carrying said device and a reflecting surface comprising a transmitter adapted to transmit a wave toward said reflecting surface, first means including a sweep generator for frequency modulating said transmitted wave, second means responsive to said transmitted wave and the wave reflected from said surface for deriving a difference frequency wave, third means energized by said difference frequency wave for producing a voltage proportional to the frequency of said difference frequency wave, fourth means responsive to said voltage for energizing a servomotor, a distance indicator having a movable pointer, means including said servomotor for driving said pointer linearly with distance for distances less than a predetermined amount, and means for driving said pointer substantially inversely as the logarithm of said distance for distances greater than said predetermined amount.

2. A frequency modulated distance measuring device for measuring the distance between a body carrying said device and a reflecting surface comprising a transmitter adapted to transmit a wave toward said reflecting surface, first means including a sweep generator for frequency modulating said transmitted wave, second means responsive to said transmitted wave and the wave reflected from said surface for deriving a difference frequency wave, third means energized by said difference frequency wave for producing a voltage proportional to the frequency of said difference frequency wave, a servomotor adapted to be energized in response to said voltage and means responsive to said servomotor for compressing the band width of said transmitter substantially inversely as the logarithm of said distance for distances greater than a predetermined amount.

3. A frequency modulated distance measuring device for measuring the distance between a body carrying said device and a reflecting surface comprising a transmitter adapted to transmit a wave toward said reflecting surface, first means including a sweep generator for frequency modulating said transmitted wave, second means responsive to said transmitted wave and the wave reflected from said surface for deriving a difference frequency wave, third means energized by said difference frequency wave for producing a first voltage proportional to the frequency of said difference frequency wave, fourth means for deriving a second voltage in opposition to said first voltage which is variable when said distance is below a predetermined amount and unchanging when said distance is greater than said predetermined amount, said fourth means including a servomotor for varying the magnitude of said second voltage in proportion to said distance, fifth means interposed between said sweep generator and said transmitter for varying the sweep width of said transmitter when said distance exceeds said predetermined amount.

4. A frequency modulated distance measuring device as recited in claim 3 wherein said fifth means comprises a voltage divider circuit including a pair of linear potentiometers whose control arms are driven by said servomotor and so arranged that the amount of sweep voltage derived from said divider circuit is constant for distances less than said predetermined amount and varies substantially inversely as the logarithm of said distance when said distance exceeds said predetermined amount.

5. A frequency modulated distance measuring device for measuring the distance between a body carrying said device and a reflecting surface comprising a transmitter adapted to transmit a wave toward said reflecting surface, first means including a sweep generator for frequency modulating said transmitted wave, second means responsive to said transmitted wave and the wave reflected from said surface for deriving a difference frequency wave, third means energized by said difference frequency wave for producing a first voltage proportional to the frequency of said difference frequency wave, fourth means for deriving a second voltage in opposition to said first voltage which is variable when said distance is below a predetermined amount and unchanging when said distance is greater than said predetermined amount, said fourth means including a servomotor for varying the magnitude of said second voltage in proportion to said distance, fifth means interposed between said sweep generator and said transmitter and actuated by said servomotor for varying the sweep width of said transmitter when said distance exceeds said predetermined amount, said fifth means being adapted to maintain constant the sweep width of said transmitter when said distance is less than said predetermined amount.

6. A frequency modulated distance measuring device for measuring the distance between a body carrying said device and a reflecting surface comprising a transmitter adapted to transmit a wave toward said reflecting surface, first means including a sweep generator for frequency modulating said transmitted wave, second means responsive to said transmitted wave and the wave reflected from said surface for deriving a difference frequency wave, third means energized by said difference frequency wave for producing a first direct current voltage proportional to the frequency of said difference frequency wave, fourth means including a first control potentiometer for deriving a second voltage in series opposition to said first voltage, a servomotor responsive to said first and second voltages and adapted to drive the arm of said first control potentiometer through an angle θ until said second voltage just balances said first voltage whereby the position of the arm of said potentiometer is indicative of said distance, a second linear control potentiometer and a third linear control potentiometer adapted to be driven through said angle θ by said servomotor and forming part of a voltage divider network which is variable only when said distance exceeds a predetermined amount, said voltage divider having an input circuit connected to said sweep generator and an output circuit connected to said transmitter, and fifth means including said voltage divider network for varying the sweep voltage applied to said transmitter substantially inversely as the logarithm of said angle θ whenever said distance exceeds said predetermined amount.

7. A frequency modulated distance measuring device for measuring the distance between a body carrying said device and a reflecting surface comprising a transmitter adapted to transmit a wave toward said reflecting surface, first means including a sweep generator for frequency modulating said transmitted wave, second means responsive to said transmitted wave and the wave reflected from said surface for deriving a difference frequency wave, third means energized by said difference frequency wave for producing a first direct current voltage proportional to the frequency of said difference frequency wave, fourth means for deriving a second direct current voltage in opposition to said first direct current voltage which is variable when said distance is below a predetermined amount and unchanging when said distance is greater than said predetermined amount, said fourth means including a servomotor for varying the magnitude of said second direct current voltage in proportion to said distance, and fifth means interposed between said sweep generator and said transmitter and actuated by said servomotor for varying the sweep width of said transmitter substantially inversely as the logarithm of said distance when the latter exceeds said predetermined amount.

8. A frequency modulated distance measuring device for measuring the distance between a body carrying said device and a reflecting surface comprising a transmitter adapted to transmit a wave toward said reflecting surface, first means including a sweep generator for frequency modulating said transmitted wave, second means responsive to said transmitted wave and the wave reflected from said surface for deriving a difference frequency wave, third means energized by said difference frequency wave for producing a first voltage proportional to the frequency of said difference frequency wave, a servomotor energized by said first voltage, a follow-up potentiometer having a control arm mechanically coupled to said servomotor and productive of a second voltage in series opposition to said first voltage, said motor being adapted to rotate until said first voltage is balanced by said second voltage when said distance is less than a predetermined amount, a voltage divider interconnected between said sweep generator and said transmitter, said divider including a second linear potentiometer and a third linear potentiometer whose control arms are connected to said servomotor, said second and third potentiometers being of fixed value while said distance is less than said predetermined amount whereby the transmitter sweep width is held constant.

9. A frequency modulated distance measuring device for measuring the distance between a body carrying said device and a reflecting surface comprising a transmitter adapted to transmit a wave toward said reflecting surface, first means including a sweep generator for frequency modulating said transmitted wave, circuit means responsive to said transmitted wave and the wave reflected from said surface for deriving a difference frequency wave, second means energized by said difference frequency wave for producing a first direct current voltage proportional to the frequency of said difference frequency wave, a source of alternating current reference voltage, third means responsive to said reference voltage and said first direct current voltage for deriving a control voltage, a servomotor energized by said control voltage, a follow-up potentiometer having a control arm mechanically coupled to said servomotor and productive of a second direct current voltage in series opposition to said first direct current voltage, said motor being adapted to rotate until said first direct current voltage is balanced to a null by said second direct current voltage when said distance is less than a predetermined amount, a voltage divider interconnected between said sweep generator and said transmitter, said divider including a second linear potentiometer and a third linear potentiometer and having control arms connected to said servomotor, said second and third potentiometers being of fixed value while said distance is less than said predetermined amount whereby the transmitter sweep width is held constant.

10. A frequency modulated distance measuring device for measuring the distance between a body carrying said device and a reflecting surface comprising a transmitter adapted to transmit a wave toward said reflecting surface, first means including a sweep generator for frequency modulating said transmitted wave, circuit means responsive to said transmitted wave and the wave reflected from said surface for deriving a difference frequency wave, second means energized by said difference frequency wave for producing a first voltage proportional to the frequency of said difference frequency wave, a servomotor energized by said first voltage, a follow-up potentiometer having a control arm mechanicaly coupled to said servomotor and productive of a second voltage in series opposition to said first voltage, said motor being adapted to rotate until said first voltage is balanced by said second voltage when said distance is less than a predetermined amount, said follow-up potentiometer having a fixed value of resistance for distances greater than said predetermined amount, a voltage divider including a second and third linear potentiometer interconnected between said sweep generator and said transmitter, said divider including a second linear control potentiometer and a third linear control potentiometer whose control arms are connected to said servomotor, said second and third potentiometers being of fixed value while said distance is less than said predetermined amount whereby the transmitter sweep width is held constant, said second and third control potentiometers having a variable resistance for distances greater than said predetermined distance, third means including said second and third potentiometers for varying the sweep width of said transmitter substantially inversely as the logarithm of said distance when said distance exceeds said predetermined distance.

11. A frequency modulated distance measuring device for measuring the distance between a body carrying said device and a reflecting surface comprising a transmitter adapted to transmit a wave toward said reflecting surface, first means including a sweep generator for frequency modulating said transmitted wave, second means responsive to said transmitted wave and the wave reflected from said surface for deriving a difference frequency wave, third means energized by said difference frequency wave for producing a first direct current voltage proportional to the frequency of said difference frequency wave, fourth means including a first linear control potentiometer for producing a second direct current voltage of magnitude dependent upon the instantaneous position of said potentiometer control arm and of opposite polarity to that of said first direct current voltage, fifth means responsive to the resultant voltage of said first and second direct current voltages for deriving an alternating current control signal whose amplitude and phase is proportional to the amplitude and polarity of said resultant voltage, a control device responsive to said control signal for effecting movement of said first potentiometer arm until said control signal is reduced to zero, a voltage divider network interposed between said sweep generator and said transmitter, said network including a second linear control potentiometer and a third linear control potentiometer whose control arms are connected to said servomotor and sixth means including said divider network for producing a voltage varying substantially as the logarithm of the aforesaid distance when said distance exceeds a predetermined value.

12. A frequency modulated distance measuring device for measuring the distance between a body carrying said device and a reflecting surface comprising a transmitter adapted to transmit a wave toward said reflecting surface, first means including a sweep generator for frequency modulating said transmitted wave, second means responsive to said transmitted wave and the wave reflected from said surface for deriving a difference frequency wave, third means energized by said difference frequency wave for producing a first direct current voltage proportional to the frequency of said different frequency wave, a first linear control potentiometer for deriving a second voltage in series opposition to said first voltage, a servomotor coupled to the arm of said first potentiometer and responsive to said first and second voltages for driving said linear first control potentiometer arm until said second voltage just balances said first voltage, an altitude indicator connected to said servomotor and whose angular position varies linearly with said distance, said first control potentiometer having a first shorted portion and a second portion whose resistance is directly proportional to the rotation of said servomotor, said control arm of said first potentiometer being in contact with said second portion when said distance is less than a predetermined amount, a voltage divider circuit interconnected between said sweep generator and said transmitter and including a second linear control potentiometer and a third linear control potentiometer each having a control arm and having a first portion whose resistance is directly proportional to the rotation of said servomotor and a second shorted portion with which the corresponding control arm is in contact when said distance is less than said predetermined amount.

13. A frequency modulated distance measuring device for measuring the distance between a body carrying said device and a reflecting surface comprising a transmitter adapted to transmit a wave toward said reflecting surface, first means including a sweep generator for frequency modulating said transmitted wave, second means responsive to said transmitted wave and the wave reflected from said surface for deriving a difference frequency wave, third means energized by said difference frequency wave for producing a first direct current voltage proportional to the frequency of said difference frequency wave, a first linear control potentiometer for deriving a second voltage in series opposition to said first voltage, a servomotor coupled to the arm of said first potentiometer and responsive to siad first and second voltages for driving said linear first control potentiometer arm until said second voltage just balances said first voltage, an altitude indicator connected to said servomotor and whose angular position varies linearly with said distance, said first control potentiometer having a control arm and having a first shorted portion and a second portion whose resistance is directly proportional to the rotation of said servomotor, said control arm of said first potentiometer being in contact with said first portion when said distance is greater than a predetermined amount, a voltage divider circuit interconnected between said sweep generator and said transmitter and including a second linear control potentiometer and a third linear control potentiometer each having a control arm and having a first shorted portion and a second portion whose resistance is directly proportional to the rotation of said servomotor, said control arms of said second and third control potentiometers being in contact with said second portion of the corresponding potentiometers when said distance is greater than said predetermined amount.

14. A frequency modulated distance measuring device for measuring the distance between a body carrying said device and a reflecting surface comprising a transmitter adapted to transmit a wave toward said reflecting surface, means including a sweep generator for frequency modulating said transmitted wave, circuit means responsive to said transmitted wave and the wave reflected from said surface for deriving a difference frequency wave, first means energized by said difference frequency wave for producing a first voltage proportional to the frequency of said difference frequency wave, a first control potentiometer, a second control potentiometer and a third control potentiometer each of which has a control arm connected to a common shaft and each including a linear active resistance winding occupying a predetermined angular portion of said potentiometer which is the same for each potentiometer, a voltage divider network including said second and third potentiometers and interposed between said sweep generator and said transmitter, a servomotor adapted to drive said common shaft, means including said first potentiometer for deriving a second voltage in opposition to said first voltage, control means operative when said distance is less than a predetermined amount and including said servomotor, said active portion of said first potentiometer and said shorted portions of said second and third potentiometers for driving said common shaft through an angle proportional to said distance, further control means operative when said distance is greater than said predetermined amount and including said servomotor, said shorted portion of said first potentiometer, and said active resistance portions of said second and third potentiometers for varying the sweep generator voltage applied to said transmitter as a function of said distance.

References Cited in the file of this patent

UNITED STATES PATENTS

| | | |
|---|---|---|
| 2,455,693 | Mercer | Dec. 7, 1948 |
| 2,505,692 | Staal | Apr. 25, 1950 |
| 2,512,330 | Hendrich | June 20, 1950 |
| 2,515,187 | Bliss | July 18, 1950 |
| 2,543,782 | Kiebert | Mar. 6, 1951 |